United States Patent [19]

Quast et al.

[11] Patent Number: 5,323,415
[45] Date of Patent: Jun. 21, 1994

[54] BRILLOUIN RING LASER

[76] Inventors: Thomas Quast, Jodokstrasse 1, 7770 Uberlingen; Michael Raab, Weildorfer Hardt 9, 7777 Salem, both of Fed. Rep. of Germany

[21] Appl. No.: 46,188

[22] Filed: Apr. 14, 1993

[30] Foreign Application Priority Data

Jun. 9, 1992 [DE] Fed. Rep. of Germany .... 4218905.5

[51] Int. Cl.$^5$ ............................................ G01C 19/72
[52] U.S. Cl. ...................... 372/94; 356/350; 385/30
[58] Field of Search ................... 372/3, 4, 5, 6, 21, 372/94; 385/27, 30, 122; 359/326, 332; 356/349, 350

[56] References Cited

U.S. PATENT DOCUMENTS

| | | | |
|---|---|---|---|
| 4,107,628 | 8/1978 | Hill et al. | 372/94 |
| 4,159,178 | 6/1979 | Vali et al. | 356/350 |
| 4,396,290 | 8/1983 | Morris | 356/350 |
| 4,429,393 | 1/1984 | Giuliano | 372/21 |
| 4,530,097 | 7/1985 | Stokes et al. | 372/6 |
| 4,780,876 | 10/1988 | Smith et al. | 372/3 |
| 4,807,953 | 2/1989 | Smith et al. | 385/27 |

FOREIGN PATENT DOCUMENTS

| | | |
|---|---|---|
| 0104942B1 | 4/1984 | European Pat. Off. . |
| 3805904C2 | 2/1992 | Fed. Rep. of Germany . |

*Primary Examiner*—John D. Lee
*Attorney, Agent, or Firm*—Lowe, Price, LeBlanc & Becker

[57] ABSTRACT

A Brillouin ring laser has a laser source, a resonator ring, a fiber optical coupler arrangement for coupling light waves from the laser source with opposite directions of propagation into the resonator ring. The coupled-in light waves have an intensity to cause acoustic waves in the resonator ring. Thereby Brillouin light waves propagating in opposite directions in the resonator ring are generated by Brillouin scattering of the coupled-in light waves at the acoustic waves. The ring laser has detectors and a coupler arrangement for the coupling-out of such Brillouin light waves propagating in opposite directions in the resonator ring and for superimposing the coupled-out Brillouin light waves at the detectors. The fiber optic coupler arrangement has a first leg and a second leg, the legs being coupled through a coupler with the resonator ring, and a six-port coupler, which couples the first and second legs with a pump fiber exposed to a laser light beam from the laser source. The first leg, with its end remote from the resonator ring, extends to a first detector, and the second leg extends to a second detector. The detectors provide detector signals, which are applied to a direction discriminator circuit for generating a directional signal indicative of the direction of rotary movement of the resonator ring.

2 Claims, 2 Drawing Sheets

BRILLOUIN RING LASER

TECHNICAL FIELD

The invention relates to a Brillouin ring laser comprising: a laser source, a resonator ring, fiber optic coupler means for coupling light waves from said laser source with opposite directions of propagation into said resonator ring, said coupled-in light waves having an intensity to cause acoustic waves in said resonator ring, whereby Brillouin light waves propagating in opposite directions in said resonator ring are generated by Brillouin scattering of said coupled-in light waves at said acoustic waves, a detector, and coupler means (32,10) for the coupling-out of such Brillouin light waves propagating in opposite directions in said resonator ring and for superimposing said coupled-out Brillouin light waves at said detector.

BACKGROUND ART

Such a Brillouin ring laser is known from European patent 0,104,942.

Ring laser serve as inertial angular rate sensors. Due to the Sagnac effect, a rotary movement of a ring laser causes the length of the resonance cavity to become different for clockwise and counter-clockwise propagating light waves. Accordingly, different frequencies of the ring lasers result for the clockwise and counter-clockwise light waves. These frequencies can be superimposed and can be caused to provide interferences at a detector. A signal at the beat frequency of the two ring laser frequencies will then be provided by the detector. This beat frequency is proportional to the angular rate. With conventional ring lasers, however, there will be a range of small angular rates in which the ring laser "locks-in" at the same frequency for both directions of propagation due to back scattering.

This "lock-in" is avoided with so-called "Brillouin" ring lasers. These Brillouin ring lasers comprise a ring resonator into which clockwise and counter-clockwise propagating light waves are "pumped" by means of a laser source. At a certain energy level of the pumped-in light waves, acoustic waves are generated in the ring resonator by the light waves. These acoustic waves propagate in the directions of the respective light waves. The acoustic waves cause variations of the refractive index and generate Brillouin light waves. These Brillouin light waves are light waves scattered at the acoustic waves. The Brillouin light waves propagate in a direction opposite to the direction of the acoustic waves and of the light waves from the laser source. The Brillouin light waves exhibit a frequency shift relative to the light waves from the laser (U.S. Pat. No. 4,159,178). Also the thus generated Brillouin light waves propagating in opposite directions are subjected to the Sagnac effect and can be utilized for measuring angular rate in the manner described above.

In European patent 0,104,942, a single continuous fiber loop is provided. The fiber loop forms an intersection with itself. Thereby the closed median portion of the fiber loop provides a resonator ring. The ends of the loop are joined by a four-port coupler. A second four-port coupler couples the beginning and the end of the resonator ring at the intersection. The first free end of the fiber loop extends to a laser source. The second free end of the fiber loop extends to a detector. Light from the laser source is coupled from the first end of the fiber loop into the second end. Thereby, light is directed to the resonator ring through both ends. The light waves supplied to the resonator ring from the two ends propagate in the resonator ring in opposite directions. Brillouin light waves are generated in the manner described above. By means of the second coupler, the Brillouin light waves from the two directions of propagation are coupled-out again into a respective one of the ends of the fiber loop. The coupled-out Brillouin light waves are superimposed by the first coupler and provide a beat signal at the detector.

The prior art Brillouin ring laser provides a beat frequency which is proportional to angular rate. The beat frequency, however, does not provide the direction of rotation.

German patent application 3,805,904 describes a fiber optical gyro operating on the basis of optical interferences and having a fiber loop. The two ends of the fiber loop and a supply fiber for supplying the light are passed through a six-port coupler. The supply fiber receives light from a light emitting diode. The ends of the fiber loop extend to photodiodes. The light emitting diode generates in the fiber ring, through the six-port coupler, clockwise and counter-clockwise light waves. The photodiodes are exposed, again through the six-port coupler, to these two light waves. An optical interference will be observed at the photodiodes. If the fiber loop is subjected to an angular rate about an axis perpendicular to its plane, the optical path lengths for the clockwise and counter-clockwise propagating light waves will be changed in opposite directions due to the Sagnac effect. This causes a corresponding change of the phases of the light waves interfering at the photodiode, and thereby a change of the light intensity. These changes of intensity have opposite directions at the two photodiodes arranged at the two ends of the fiber loop, depending on the direction of the rotation. Thus the relative intensity changes at the two photodiodes permit conclusions on the phase change and, thereby, on the angular rate and direction of rotation.

This is not a laser with a resonance. There are no frequency variations but a phase shift of the light. There are no A.C. signals at the photodiodes.

DISCLOSURE OF THE INVENTION

It is an object of the invention to provide a directional signal with a Brillouin ring laser of the type defined in the beginning.

According to the invention, this object is achieved in that (a) said fiber optical coupler means comprise a first leg and a second leg, said legs being coupled through a coupler with said resonator ring, (b) said fiber optical coupler means further comprise a six-port coupler, which couples said first and second legs with a pump fiber exposed to a laser light beam from said laser source, (c) said first leg, with its end remote from said resonator ring, extending to a first detector, and said second leg, with its end remote from said resonator ring, extending to a second detector, said first and second detectors providing detector signals, (d) said detector signals from said first and second detectors being applied to direction discriminator circuit means for generating a directional signal from the phase relation between the a.c. components of said detector signals resulting from rotary movement of said resonator ring, said directional signal being indicative of the direction of said rotary movement.

According to the invention, a six-port coupler is provided through which the light waves supplied through a separate fiber by the laser source are symmetrically coupled into the two ends of the fiber loop. Two detectors are provided, one detector at each end of the fiber loop. It can be shown, that the direction of rotation can be derived from the phase relation of the a.c. signals detected at the two ends of the fiber loop.

Preferably, said direction discriminator circuit means comprises a first channel and a second channel, said first detector signal being applied to said first channel, and said second detector signal being applied to said second channel, each of said first and second channels comprises a high-pass filter and a comparator for converting said detector signal to square-wave signals in-phase therewith, said square-wave signals are applied to a D-flip-flop which, at each rising edge of one of the square-wave signals, adopts the state of the other signal as sign signal, said state being a function of said direction of rotary movement.

BRIEF DESCRIPTION OF DRAWINGS

An embodiment of the invention will be described hereinbelow with reference to the accompanying drawings.

BEST MODE FOR CARRYING OUT THE INVENTION

Figure 1:
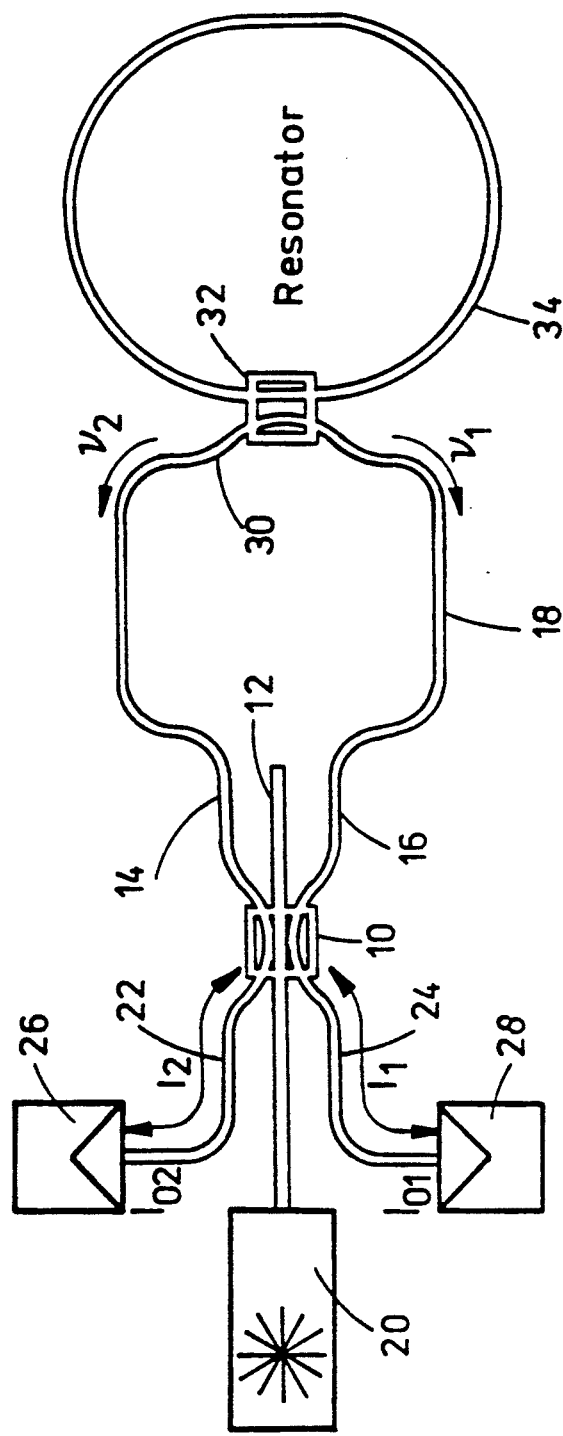
FIG. 1 shows a Brillouin ring laser with detection of direction of rotation.

The Brillouin ring laser has a six-port coupler 10. The six-port coupler 10 couples a pump fiber 12 with two legs 14 and 16 of a fiber loop 18. The pump fiber 12 extends to a laser source 20. Each of the free ends 22 and 24 of the legs 14 and 16, respectively, beyond the six-port coupler 10 extends to an associated photoelectric detector 26 or 28, respectively. The fiber loop 18 is coupled, in its median portion 30, with a resonator ring 34 through a four-port coupler 32.

Figure 2:
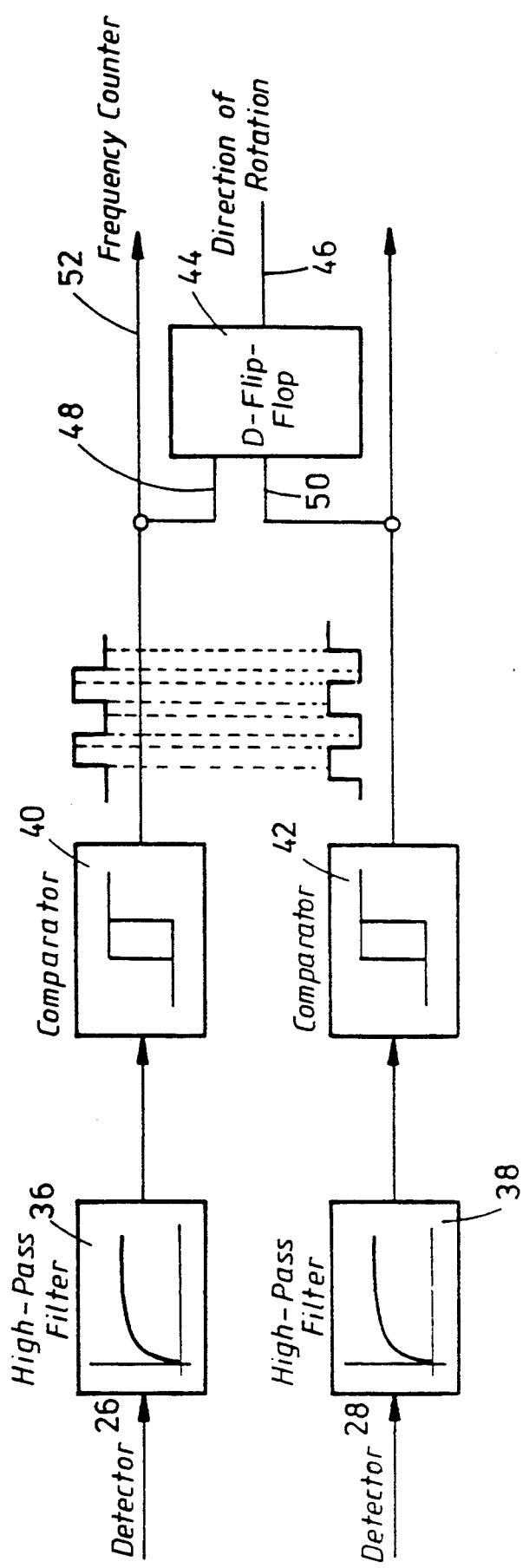
FIG. 2 shows the signal processing of the two detector signals for generating a directional signal.

Each of the signals from the two detectors 26 and 28 is applied to an associated high-pass filter 36 or 38, respectively. Thereby, mean value-free signals are generated. These signals are applied to comparators 40 or 42, respectively. The comparators generate, from the sinusoidal signals, square-wave signals in-phase therewith, as illustrated in FIG. 2. The square wave signals are applied to a D-flip-flop 44. The D-flip-flop 44, at its output 46, adopts the instantaneous state of detector 28 with each rising edge of the square-wave signal from detector 26. This instantaneous state depends on the direction of rotation. The square-wave signal which is derived from the signal of the detector 26 is applied to an input 48 of the D-flip-flop. The square-wave signal which is derived from the signal of the detector 28 is applied to an input 50.

The pulse sequence which is provided by the comparator 40 is, at the same time, applied to a counter, at an output 52, for determining the beat frequency and, thereby, the angular rate.

The described arrangement operates as follows:

The light waves leaving the resonator ring 34 have frequencies $v_1$ and $v_2$ and initial phases $\phi_1$ and $\phi_2$, respectively. The light waves pass through the legs 16 and 14, respectively, of the fiber loop 18 and are superimposed by means of the six-port coupler both in the end 22 and in the end 24.

The coupling angle of the symmetrical six-port coupler 10 from fiber to fiber is, taking the helicity (clockwise, counter-clockwise) into account, substantially 60° (neglecting the loss angle). This means that a phase difference exists between, for example, the light wave at the frequency $v_2$ coupled from the leg 14 of the fiber loop 18 into the end 24 of the leg 16 and the light wave of the frequency $v_2$ propagating in the leg 14. Correspondingly, there is a phase difference of 60° between the light wave of the frequency $v_1$ coupled in the six-port coupler 10 from the leg 16 into the end 22 and the light wave of this frequency $v_1$ propagating in the leg 16. An optical interference occurs at detector 26 between the light wave of the frequency $v_2$ without 60°-phase shift and the coupled-in light wave of the frequency $v_1$ with the 60°-phase shift. With a clockwise direction of rotation, as viewed in FIG. 1, $v_1$ is higher than $v_2$. The an a.c. signal at the beat frequency $v_1-v_2$ appears at the detector 26. The signal has a phase lag of 60°, the coupling angle $\phi_k$, relative to a hypothetical signal which would result from optical interference of light waves from the legs 14 and 16 without coupling-over by the six-port coupler 10. An a.c. signal at a beat frequency also of $v_1-v_2$ appears at the detector 28. This signal, however, exhibits a phase lead of 60° or the coupling angle $\phi_k$ relative to the hypothetical signal mentioned before. Now the light wave at the frequency $v_2$ from the leg 14 has a phase shift. If, with a counter-clockwise angular rate, as viewed in FIG. 1, $v_2$ is larger than $v_1$, the detector signal at the beat frequency $v_2-v_1$ at the detector 26 exhibits a phase lead, and the detector signal at the beat frequency $v_2-v_1$ at the detector 28 exhibits a phase lag. Therefore, a phase difference of plus or minus 120° or of $2\phi_k$ exists between the detector signals, depending on the direction of rotation of the angular rate measured. If one of the two detector signals is used as reference, the other signal will be either positive or negative at the moment, for example, of the rising passage through zero of this reference signal, depending on the direction of rotation. This provides a signal indicative of the direction of rotation.

The signal indicative of the direction of rotation is generated from the detector signals by means of the circuit shown in FIG. 2. When the square-wave signal from comparator 40 changes from L to H, the state of the square wave signal at comparator 42 is "H". Thereby, the output 46 of the D-flip-flop is changed to the state H. With opposite direction of rotation, the square wave signal at comparator 42 at the moment, when the square wave signal at comparator 40 changes from L to H, is in the state of "L". Then the output 46 of the D-flip-flop 44 will adopt the state of L.

We claim:

1. A Brillouin ring laser comprising:
   a laser source,
   a resonator ring,
   fiber optical coupler means for coupling light waves from said laser source with opposite directions of propagation into said resonator ring, said coupled-in light waves having an intensity to cause acoustic waves in said resonator ring, whereby Brillouin light waves propagating in opposite directions in said resonator ring are generated by Brillouin scattering of said coupled-in light waves at said acoustic waves,
   a detector, and coupler means for the coupling-out of such Brillouin light waves propagating in opposite directions in said resonator ring and for superimposing said coupled-out Brillouin light waves at said detector, wherein said fiber optical coupler means comprise a first leg and a second leg, said legs being coupled through a coupler with said resonator ring, said fiber optical coupler means further comprise a six-port coupler, which couples said first and second legs with a pump fiber exposed to a laser light beam from said laser source, said first leg, with its end remote from said resonator ring, extending to a first detector, and said second leg, with its end remote from said resonator ring, extending to a second detector, said first and second detectors providing detector signals, and said detector signals from said first and second detectors being applied to direction discriminator circuit means for generating a directional signal from the phase relation between the a.c. components of said detector signals resulting from rotary movement of said resonator ring, said directional signal being indicative of the direction of said rotary movement.

2. A Brillouin ring laser comprising:

a laser source, a resonator ring, fiber optical coupler means for coupling light waves from said laser source with opposite directions of propagation into said resonator ring, said coupled-in light waves having an intensity to cause acoustic waves in said resonator ring, whereby Brillouin light waves propagating in opposite directions in said resonator ring are generated by Brillouin scattering of said coupled-in light waves at said acoustic waves, a detector, and coupler means for the coupling-out of such Brillouin light waves propagating in opposite directions in said resonator ring and for superimposing said coupled-out Brillouin light waves at said detector, wherein said fiber optical coupler means comprise a first leg and a second leg, said legs being coupled through a coupler with said resonator ring, said fiber optical coupler means further comprise a six-port coupler, which couples said first and second legs with a pump fiber exposed to a laser light beam from said laser source, said first leg, with its end remote from said resonator ring, extending to a first detector, and said second leg, with its end remote from said resonator ring, extending to a second detector, said first and second detectors providing detector signals, said detector signals from said first and second detectors being applied to direction discriminator circuit means for generating a directional signal from the phase relation between the a.c. components of said detector signals resulting from rotary movement of said resonator ring, said directional signal being indicative of the direction of said rotary movement, said direction discriminator circuit means comprises a first channel and a second channel, said first detector signal being applied to said first channel, and said second detector signal being applied to said second channel, each of said first and second channels comprises a high-pass fiber and a comparator for converting said detector signal to square-wave signals in-phase therewith, and said square-wave signals are applied to a D-flip-flop which, at each rising edge of one of the square-wave signals, adopts the state of the other signal as sign signal, said state being a function of said direction of rotary movement.

* * * * *